(12) United States Patent
L G et al.

(10) Patent No.: US 9,166,687 B2
(45) Date of Patent: Oct. 20, 2015

(54) METHOD AND APPARATUS FOR USING CREDITS TO DETERMINE CABLE LENGTH

(71) Applicant: Cisco Technology, Inc., San Jose, CA (US)

(72) Inventors: Rajesh L G, Bangalore (IN); Deepak Srinivas Mayya, Fremont, CA (US); Lalit Kumar, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 272 days.

(21) Appl. No.: 13/852,964

(22) Filed: Mar. 28, 2013

(65) Prior Publication Data

US 2014/0294379 A1    Oct. 2, 2014

(51) Int. Cl.
*G01R 31/08*    (2006.01)
*H04B 10/25*    (2013.01)
*H04B 10/077*    (2013.01)

(52) U.S. Cl.
CPC .............. *H04B 10/25* (2013.01); *H04B 10/077* (2013.01)

(58) Field of Classification Search
None
See application file for complete search history.

(56) References Cited

U.S. PATENT DOCUMENTS

| | | | |
|---|---|---|---|
| 7,088,735 B1* | 8/2006 | Reohr et al. | 370/466 |
| 7,248,587 B1* | 7/2007 | Sharma | 370/394 |
| 7,515,532 B2* | 4/2009 | Casper et al. | 370/227 |
| 7,990,864 B2* | 8/2011 | Xu | 370/232 |
| 2005/0076113 A1* | 4/2005 | Klotz et al. | 709/224 |
| 2007/0081543 A1* | 4/2007 | Brenes et al. | 370/401 |
| 2008/0212613 A1* | 9/2008 | Perkinson et al. | 370/475 |
| 2010/0128605 A1* | 5/2010 | Chavan et al. | 370/230.1 |
| 2013/0070763 A1* | 3/2013 | Kumar et al. | 370/389 |
| 2013/0128884 A1* | 5/2013 | Decusatis et al. | 370/357 |

\* cited by examiner

*Primary Examiner* — Phirin Sam

(57) ABSTRACT

Various systems and methods for using credits to determine cable length are described herein. A number of available credits is determined at a transmitter, the credits being received at the transmitter from a receiver, and each of the credits being used for the transmitter to transmit a packet to the receiver. An average number of credits for a period is determined. The cable length between the transmitter and the receiver is determined based on the average number of credits for the period.

23 Claims, 3 Drawing Sheets

METHOD AND APPARATUS FOR USING CREDITS TO DETERMINE CABLE LENGTH

TECHNICAL FIELD

The present disclosure relates generally to Fibre Channel and in particular to a method and apparatus for using credits to determine cable length.

BACKGROUND

Fibre Channel is a high-speed network technology primarily used for storage networking, including storage area networks (SAN) in enterprise storage environments.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
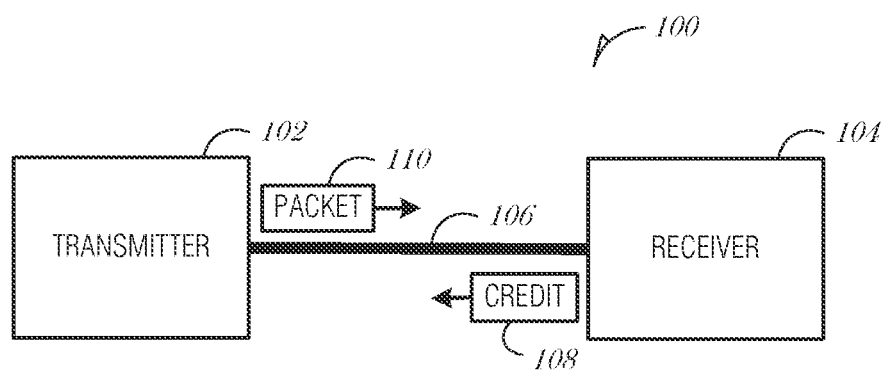
FIG. 1 is a block diagram illustrating a Fibre Channel network, according to an embodiment.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments.

System Overview

In a Fibre Channel (FC) network, flow control is used between a transmitter and a receiver to avoid buffer overrun at the receiver. One mechanism of flow control is using credits and credit count. A credit is also referred to as a buffer credit or a buffer-to-buffer credit (BBC). The number of credits is equal to the number of buffers allocated by the receiver to the transmitter. Each credit issued by the receiver to the transmitter allows the transmitter to send one packet to the receiver. The credit may be issued by transmitting a signal, such as an R_RDY, ACK_0, ACK_1, or ACK_N, from the receiver to the transmitter. These primitive signals are defined in the Fibre Channel Specification (e.g., Fibre Channel, Physical and Signaling Interface (FC-PH), Rev. 4.3, Jun. 1, 1994). The packet may be of any size. Each buffer has sufficient space to hold a maximum sized packet. The transmitter keeps track of the number of credits it receives from the receiver. The credit count is referred to as "BB_Credit_CNT" in the Fibre Channel Specification. The transmitter decrements the number of available credits (BB_Credit_CNT) by one every time it transmits a packet. The receiver first stores this frame (e.g., packet) in its buffer. After processing the packet, the receiver will read out the packet freeing the memory. The receiver then returns the credit to the transmitter for further packets (e.g., by using an R_RDY signal). This flow control scheme is used in Fibre Channel protocol to obtain lossless transmission of frames.

A receiver may have a maximum number of outstanding credits. The maximum number is referred to as "BB_Credit" in the Fibre Channel Specification. This represents the maximum number of packets that the receiver may guarantee to accept when its internal buffers are empty. The maximum number of packets may be a programmable number in the receiver.

A receiver may also have a number of issued credits. This represents the number of credits the receiver has issued but has not yet received packets for (e.g., outstanding credits). This value may be a number that is always less than or equal to the maximum number of outstanding credits. Also, the number of issued credits will vary depending on the current available free memory at the receiver.

Transmitters and receivers may be various types of networked devices, including but not limited to switches, routers, or the like.

In a network system such as Fibre Channel network, a recipient device issues credits; this indicates to a transmitting device that it is allowed to send data packets. In Fibre Channel, each credit allows one packet (also called a frame) to be transmitted. The recipient device issues credits only when it may guarantee acceptance of a frame. To fully utilize the throughput available on a link, the transmitter should not run out of credits until the credits start returning from the receiver. The worst case scenario for this is when the transmitter is sending minimum size packets. The number of credits outstanding from the receiver should be sufficient to cover the round trip time—the packet from transmitter to receiver and the credit returning to transmitter. The round trip time has two components: 1) the latency internal to the transmitting and receiving devices and 2) the latency through the link (electrical or optical) medium.

Usually network systems are designed to issue at least as many credits needed for the transmitting device to be able to send minimum sized frames back to back without interruption, thus utilizing the available bandwidth of the link. With the internal component of the round trip time being fairly constant, the available credits at the transmitting device are an indication of the credits consumed by the data in transit through the transmission cable between the devices. If the cable length is longer, there is more data in transit and thus more credits in use. This results in lower available credits at the transmitter. While some implementations detect congestion by analyzing when available credits approach zero, there are no known credit averaging implementations to deduce the cable length. In embodiments described herein, mechanisms may use the available credits to deduce the cable length.

In order to obtain accurate results, some conditions are assumed. One, the transmitting device should always have frames ready to send. Two, the transmitting device should never run out of credits. Three, there should not be any congestion at the receiving device; otherwise this may cause an artificially low number of available credits the transmitter. Four, the frame size should be constant.

Under these conditions, the variations in the number of available credits at the transmitting device are a measure of the round trip time. As a result, the variations may be used to estimate the cable length.

While the first, second, and third conditions may be monitored and controlled in a deployment, there is not as much control for packet size. If packet sizes are not constant, then monitoring the instantaneous values of the available credits will not give a consistent value. Larger packet sizes will use fewer credits and vice versa. Therefore, a scheme is needed that works independent of the variations in packet size.

Because of the varying sizes of the data packets in some implementations, the instantaneous value of the available credits is not as useful for determining the cable length. The average of frame sizes is more likely to be consistent in a typical deployment of a network system. As such, the average of the available credits provides more meaningful information.

In an embodiment, a weighted averaging scheme is used to emphasize more recent credit status so that changes in status are more quickly observable than in the case of a simple averaging scheme. The weighted average may be computed by periodic execution of Equations 1 and 1.1 below. The instantaneous value of the available credits is sampled periodically. The period may be a programmable interval. The interval may be in the nanosecond to microsecond range, such as 500 nanoseconds, 1 microsecond, or the like. In an embodiment, a hardware implementation is used. Because of the execution speed, implementation in hardware allows shorter periods than would be possible using a comparable software implementation.

$$tx\_average\_=tx\_average\_sum-(tx\_average\_sum>>avg\_weight)+tx\_credits \quad \text{Eq. 1:}$$

$$tx\_average=tx\_average\_sum>>avg\_weight \quad \text{Eq. 1.1:}$$

Where tx_average is the weighted average, tx_average_sum is a sum of all samples used to compute the weighted average, avg_weight is a programmable number, and tx_credits is the current instantaneous value of the available credits. The ">>" operation is a right arithmetic bit shift. A right arithmetic bit shift by n is equivalent to dividing by $2^n$. As a result, Equation 1 computes the weighted sum of all samples. This is then divided by the number of samples to get the average value in Equation 1.1. Subtracting tx_average_sum shifted by the avg_weight value instead of the oldest sample, as in a typical average computation, removes the need to store the sample values. This may result in significant savings in a hardware implementation. The results are very close to averaging over $2^{avg\_weight}$ samples.

A number of "packets in flight" may be obtained from the execution of Equations 2A or 2B below. The term "packets in flight" refers to the packets for which return credits have not yet been received at the transmitter. In other words, the transmitter has or is able to obtain the maximum number of credits and may calculate or obtain an instantaneous value of the number of credits available at the transmitter. The difference between the maximum number and the number of credits held by the transmitter represent the packets in flight. Alternatively, an average number of credits may be used to determine the packets in flight.

$$\text{packets in flight=maximum outstanding credits}-tx\_credits \quad \text{Eq. 2A:}$$

$$\text{packets in flight=maximum outstanding credits}-tx\_average \quad \text{Eq. 2B:}$$

Once the number of "packets in flight" is determined, a number of "bits in flight" may be obtained. The number of "bits in flight" is simply the number of packets (or average number of packets) multiplied by the actual packet sizes (or average packet size). This is represented in Equation 3A and Equation 3B. The average packet size, if not already known, may be obtained from the packet and byte counters that are available on a typical Fibre Channel device.

$$\text{bits in flight=packet size*packets in flight} \quad \text{Eq. 3A:}$$

$$\text{bits in flight=average packet size*packets in flight} \quad \text{Eq. 3B:}$$

Using the number of "bits in flight," a round trip time (RTT) may be calculated. A transmission rate is either known or calculated by the transmitting device. Using the "bits in flight" and the transmission rate, the RTT is calculated in Equation 4.

$$\text{RTT=bits in flight/transmission rate} \quad \text{Eq. 3B:}$$

With the RTT, an estimate of cable length may be obtained using Equation 5.

$$\text{Estimated cable length}=(\text{RTT}-k)*c \quad \text{Eq. 5:}$$

Where k is a constant used to account for the latency internal to the transmitting and receiving devices, and where c is the speed of light. The value k is typically less than a microsecond, but it may vary depending on the device. k may be determined from a hardware design specification or empirically using a sample of known cable lengths.

Because the metrics are available locally and remotely, the cable length estimation may be performed at the Fibre Channel device or at a remote compute device.

The weighted average of the credits used may also be used to debug throughput performance issues. Further, the weighted average may be used to detect if the programming of the maximum outstanding credits is sufficient for the round trip time in a particular deployment.

Example Embodiments

FIG. 1 is a block diagram illustrating a Fibre Channel network 100, according to an embodiment. In the Fibre Channel network 100, a transmitter 102 (e.g., transmitting device) receives a credit (e.g., token) 108 from a receiver 104 (e.g., receiving device) over a cable 106. In response, the transmitter 102 transmits a packet (e.g., frame) 110 to the receiver 104 over the cable 106. The transmitter 102 stores the available credits and as each packet 110 is sent to the receiver 104, the transmitter 102 subtracts one credit 108 from the number of available credits. As the receiver 104 processes received packets 110, the receiver 104 transmits additional credits 108 back to the transmitter 102. The transmitter 102 and receiver 104 may be various types of networked devices, including but not limited to switches, routers, or the like. Fibre Channel may be used over various physical media. As such, the cable 106 may be an optical cable, a coaxial cable, or the like.

Figure 2:
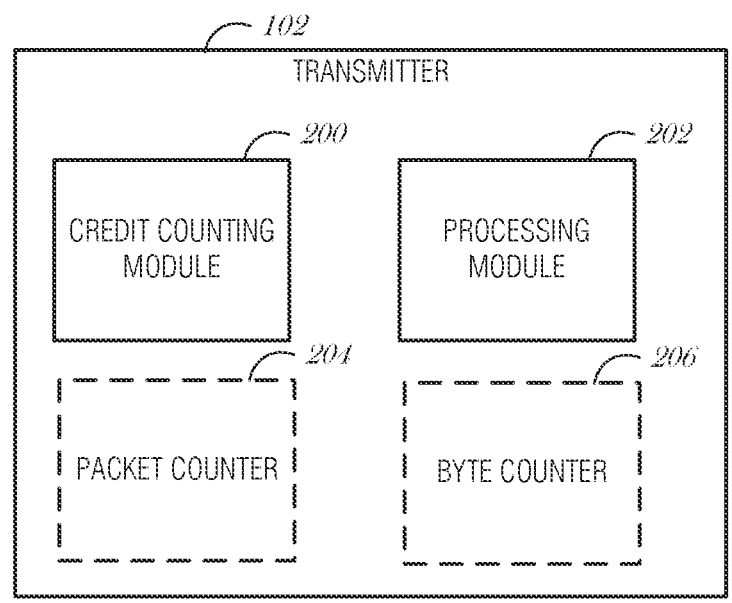
FIG. 2 is a block diagram illustrating a transmitter, according to an embodiment.

FIG. 2 is a block diagram illustrating a transmitter 102, according to an embodiment. The transmitter 102 includes a credit counting module 200, a processing module 202. In an embodiment, the credit counting module 200 is configured to maintain an available number of credits at a transmitting device, where each credit 108 was sent to the device from a receiving device, and where one of the available credits is consumed when the transmitting device transmits a packet 110 of data to the receiving device. In an embodiment, the processing module 202 is configured to obtain an average number of credits for a period and determine the cable length between the transmitting device and the receiving device based on the average number of credits for the period. In some embodiments, the transmitter 102 optionally includes a packet counter 204 and a byte counter 206. The packet counter 204 maintains a current number of packets transmitted and the byte counter 206 maintains a number of bytes transmitted.

In an embodiment, the processing module 202 is further configured to use a weighted average as the average number of credits for the period, where the weighted average is calculated by subtracting a weighted value from a running average value, adding the number of available credits to obtain a sum, and then dividing the sum by a number of samples in the period.

In an embodiment, the processing module 202 is further configured to calculate a number of packets in flight, calculate a number of bits in flight based on the number of packets in flight, calculate a round trip time based on the number of bits in flight and a transmission rate, and calculate the cable length based on the round trip time.

Figure 3:
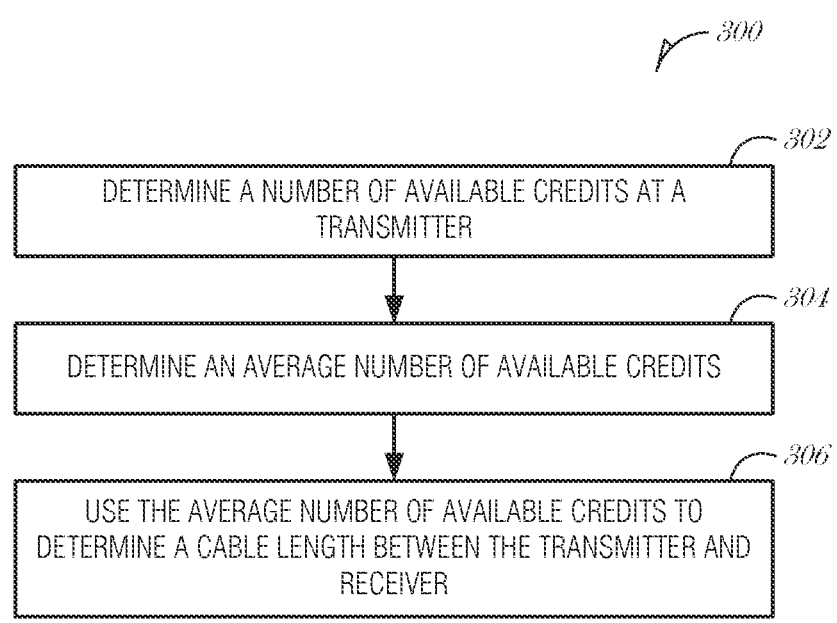
FIG. 3 is a flowchart illustrating a method for determining a cable length, according to an embodiment.

FIG. 3 is a flowchart illustrating a method 300 for determining a cable length, according to an embodiment. At block 302, a number of available credits is determined at a transmitter (e.g., transmitter 102). The credits being received at the transmitter from a receiver (e.g., receiver 104), and each of the credits being used for the transmitter to transmit a packet to the receiver.

At block 304, an average number of available credits is determined for a period, where the average number of credits is based at least in part on the number of credits determined in block 302. In an embodiment, the average number of credits for the period comprises a weighted average. Various methodologies may be used to obtain a weighted average, for example, by weighting newer values of the number of credits more than older values, by aggregating the number of credits over a moving window, or the like. In a further embodiment, the weighted average is calculated by subtracting a weighted value from a running average value, adding the number of available credits to obtain a sum, and then dividing the sum by a number of samples in the period. One example is illustrated above in Equations 1 and 1.1. The weighted value may be computed by dividing a running average value by a predetermined value (e.g., 2, 4, 8, or some other value). The predetermined value may be configured by a user. The predetermined value may be a power of 2. As discussed above in the discussion of Equation 1, a right bit shift may be used to effectively divide the running average value by $2^n$. Using a bit shift for division may provide performance advantages over performing an arbitrary division operation in software. Alternately, the predetermined value may be any positive value. For example, the running average may be divided by 10 in the Equation 1 from above.

At block 306, the average number of available credits is used to determine a cable length between the transmitter and the receiver. In an embodiment, determining the cable length comprises: calculating a number of packets in flight; calculating a number of bits in flight based on the number of packets in flight; calculating a round trip time based on the number of bits in flight and a transmission rate; and calculating the cable length based on the round trip time.

In a further embodiment, calculating the number of packets in flight comprises subtracting the number of available credits from a maximum number of outstanding credits. In an alternative embodiment, calculating the number of packets in flight comprises subtracting the average number of credits for the period from a maximum number of outstanding credits. Examples are illustrated above in Equations 2A and 2B.

In a further embodiment, calculating the number of bits in flight based on the number of packets in flight comprises multiplying a packet size with the number of packets in flight. In an alternative embodiment, calculating the number of bits in flight based on the number of packets in flight comprises multiplying an average packet size with the number of packets in flight. Examples are illustrated above in Equations 3A and 3B.

In a further embodiment, calculating a round trip time based on the number of bits in flight and a transmission rate comprises dividing the number of bits in flight by the transmission rate. One example is illustrated above in Equation 4.

In a further embodiment, calculating the cable length based on the round trip time comprises multiplying the round trip time with the speed of light. In a further embodiment, adjusting round trip time with a value to account for the internal device latency and using the adjusted round trip time to determine the cable length. One example is illustrated above in Equation 5.

Hardware Platform

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms, Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software e.g., instructions, an application portion, or an application) as a module that operates to perform specified operations. In an example, the software may reside on a machine-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Figure 4:
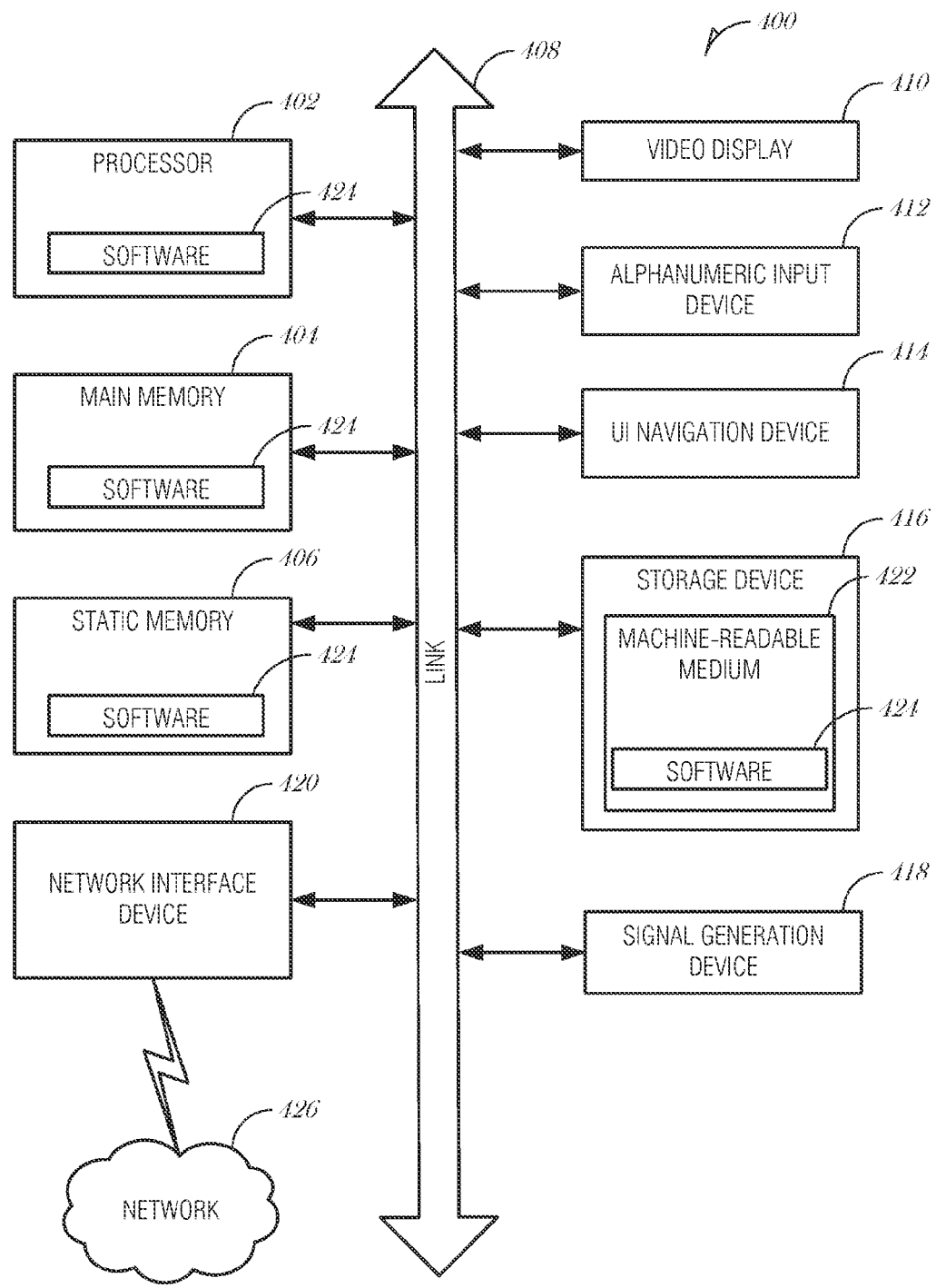
FIG. 4 is a block diagram illustrating a machine in the example form of a computer system, within which a set or sequence of instructions may be executed to cause the machine to perform any one of the methodologies discussed herein, according to an example embodiment.

FIG. 4 is a block diagram illustrating a machine in the example form of a computer system 400, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. In an embodiment, the machine is a Fibre Channel device. Examples include, but are not limited to Fibre Channel switches, hubs, gateways, and bridges. In other embodiments, the machine may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 400 includes at least one processor 402 (e.g., a central processing unit (CPU), a graphics processing unit (GPU) or both, processor cores, compute nodes, etc.), a main memory 404 and a static memory 406, which communicate with each other via a link 408 (e.g., bus). The computer system 400 may further include a video display unit 410, an alphanumeric input device 412 (e.g., a keyboard), and a user interface (UI) navigation device 414 (e.g., a mouse). In one embodiment, the video display unit 410, input device 412 and UI navigation device 414 are incorporated into a touch screen display. The computer system 400 may additionally include a storage device 416 (e.g., a drive unit), a signal generation device 418 (e.g., a speaker), a network interface device 420, and one or more sensors (not shown), such as a global positioning system (GPS) sensor, compass, accelerometer, or other sensor.

The storage device 416 includes a machine-readable medium 422 on which is stored one or more sets of data structures and instructions 424 (e.g., software) embodying or utilized by any one or more of the methodologies or functions described herein. The instructions 424 may also reside, completely or at least partially, within the main memory 404, static memory 406, and/or within the processor 402 during execution thereof by the computer system 400, with the main memory 404, static memory 406, and the processor 402 also constituting machine-readable media.

While the machine-readable medium 422 is illustrated in an example embodiment to be a single medium, the term "machine-readable medium" may include a single medium or multiple media (e.g., a centralized or distributed database, and/or associated caches and servers) that store the one or more instructions 424. The term "machine-readable medium" shall also be taken to include any tangible medium that is capable of storing, encoding or carrying instructions 424 for execution by the machine and that cause the machine to perform any one or more of the methodologies of the present disclosure or that is capable of storing, encoding or carrying data structures utilized by or associated with such instructions 424. The term "machine-readable medium" shall accordingly be taken to include, but not be limited to, solid-state memories, and optical and magnetic media. Specific examples of machine-readable media 422 include non-volatile memory, including, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 424 may further be transmitted or received over a communications network 426 using a transmission medium via the network interface device 420 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions 424 for execution by the machine, and includes digital or analog communications signals or other intangible medium to facilitate communication of such software.

Although embodiments have been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense.

The Abstract is provided to allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method comprising:
   determining a number of available credits at a transmitter, the credits being received at the transmitter from a receiver, the transmitter and receiver being communicatively coupled by a cable, and each of the credits being used by the transmitter to transmit a packet to the receiver;
   determining an average number of credits for a period based on credits received at the transmitter; and
   determining, by a processing device, a cable length of the cable between the transmitter and the receiver based on the average number of credits for the period.

2. The method of claim 1, wherein the average number of credits for the period comprises a weighted average.

3. The method of claim 2, wherein the weighted average is calculated by subtracting a weighted value from a running average number of credits, adding the number of available credits to obtain a sum, and then dividing the sum by a number of samples in the period.

4. The method of claim 1, wherein determining the cable length comprises:
   calculating a number of packets in flight;
   calculating a number of bits in flight based on the number of packets in flight;
   calculating a round trip time based on the number of bits in flight and a transmission rate; and
   calculating the cable length based on the round trip time.

5. The method of claim 4, wherein calculating the number of packets in flight comprises subtracting the number of available credits from a maximum number of outstanding credits.

6. The method of claim 4, wherein calculating the number of packets in flight comprises subtracting the average number of credits for the period from a maximum number of outstanding credits.

7. The method of claim 4, wherein calculating the number of bits in flight based on the number of packets in flight comprises multiplying a packet size with the number of packets in flight.

8. The method of claim 4, wherein calculating the number of bits in flight based on the number of packets in flight comprises multiplying an average packet size with the number of packets in flight.

9. The method of claim 4, wherein calculating the round trip time based on the number of bits in flight and the transmission rate comprises dividing the number of bits in flight by the transmission rate.

10. The method of claim 4, wherein calculating the cable length based on the round trip time comprises multiplying the round trip time with the speed of light.

11. The method of claim 10, comprising adjusting round trip time with a value to account for internal device latency and using the adjusted round trip time to determine the cable length.

12. A non-transitory machine-readable medium comprising instructions for determining a cable length which, when executed on a machine, cause the machine to:
   determine a number of available credits at a transmitter, the credits being received at the transmitter from a receiver, the transmitter and receiver being communicatively coupled by a cable, and each of the credits being used by the transmitter to transmit a packet to the receiver;
   determine an average number of credits for a period based on credits received at the transmitter; and
   determine a cable length of the cable between the transmitter and the receiver based on the average number of credits for the period.

13. The non-transitory machine-readable medium of claim 12, wherein the average number of credits for the period comprises a weighted average.

14. The non-transitory machine-readable medium of claim 13, wherein the weighted average is calculated by subtracting a weighted value from a running average number of credits, adding the number of available credits to obtain a sum, and then dividing the sum by a number of samples in the period.

15. The non-transitory machine-readable medium of claim 12, wherein the instructions to determine the cable length comprise instructions which, when executed by the machine, cause the machine to:
   calculate a number of packets in flight;
   calculate a number of bits in flight based on the number of packets in flight;
   calculate a round trip time based on the number of bits in flight and a transmission rate; and
   calculate the cable length based on the round trip time.

16. The non-transitory machine-readable medium of claim 15, wherein calculating the number of packets in flight comprises subtracting either the number of available credits or an average number of credits from a maximum number of outstanding credits.

17. The non-transitory machine-readable medium of claim 15, wherein calculating the number of bits in flight based on the number of packets in flight comprises multiplying either a packet size or an average packet size with the number of packets in flight.

18. The non-transitory machine-readable medium of claim 15, wherein calculating a round trip time based on the number of bits in flight and a transmission rate comprises dividing the number of bits in flight by the transmission rate.

19. The non-transitory machine-readable medium of claim 15, wherein calculating the cable length based on the round trip time comprises multiplying the round trip time with the speed of light.

20. The non-transitory machine-readable medium of claim 19, comprising adjusting the round trip time with a value to account for the internal device latency and using the adjusted round trip time to determine the cable length.

21. A device comprising:
   a credit counting module to maintain a number of available credits at a transmitting device, wherein each credit was sent to the device from a receiving device, the device and receiving device being in a network communicatively coupled by a cable, and wherein one of the available credits is consumed when the transmitting device transmits a packet of data to the receiving device;
   a processing module to:
      obtain an average number of credits fix a period based on credits received at the transmitting device; and
      determine a cable length of the cable between the transmitting device and the receiving device based on the average number of credits for the period.

22. The device of claim 21, wherein the processing module is further configured to:
   use a weighted average as the average number of credits for the period, wherein the weighted average is calculated by subtracting a weighted value from a miming average value, adding the number of available credits to obtain a sum, and then dividing the sum by a number of samples in the period.

23. The device of claim 21, wherein the processing module is further configured to:
   calculate a number of packets in flight;
   calculate a number of bits in flight based on the number of packets in flight;
   calculate a round trip time based on the number of bits in flight and a transmission rate; and
   calculate the cable length based on the round trip time.

* * * * *